Figure 1:
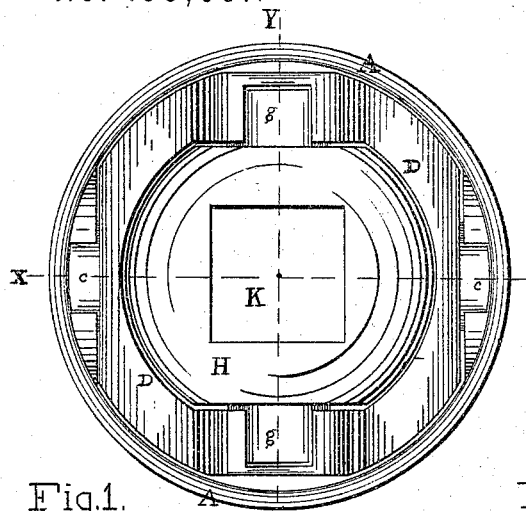

H. S. LELAND.
Universal Couplings.

No. 138,031. Patented April 22, 1873.

Herbert S. Leland,
by Job Abbott
Attorney.

UNITED STATES PATENT OFFICE.

HERBERT S. LELAND, OF CANTON, OHIO.

IMPROVEMENT IN UNIVERSAL COUPLINGS.

Specification forming part of Letters Patent No. 138,031, dated April 22, 1873; application filed March 28, 1873.

*To all whom it may concern:*

Be it known that I, HERBERT S. LELAND, of Canton, in the county of Stark and State of Ohio, have invented certain new and useful Improvements in Universal Shaft-Couplings; and that the following is a full, clear, and exact specification thereof, which will enable others skilled in the art to make and use the said invention.

My invention relates to that class of shaft-couplings known as universal shaft-couplings, which are used for connecting revolving shafts running at an angle with each other; and is particularly designed for coupling the shafting for driving thrashers and separators, although it may be applied to other purposes. Said invention consists in the combination of a coupling-sleeve, coupling-ring, and spherical socket, the coupling-ring having two pivot-bearings in the coupling-sleeve, and the spherical socket having two bearings in the coupling-ring at right angles to the bearings of said coupling-ring in the sleeve, and the said coupling and spherical socket being so constructed that the ring can be turned over in the sleeve and the socket in the ring, so that, as the bearings of either the ring or socket become worn on one side, these parts can be reversed so as to bring the other sides of said bearings into working position, as is hereinafter more fully shown, thereby increasing the durability of the coupling. Said invention also consists of the combination, with a coupling-ring, of a spherical socket, with two bearings in said ring, and of such size as to be free to turn in said ring; the peculiar utility of the spherical socket in this combination consisting in the fact that said socket affords a sufficient bearing for the end of the shaft without requiring a socket cast at the side of it to receive said shaft, thus allowing a greater range of angular motion to the coupling in addition to the facility afforded for turning over the socket, as herein described. Said invention consists, also, in the combination of a spherical socket with elongated gudgeons with a coupling-ring having circular bearings on the inner face thereof, connected by grooves with the sides of said ring; also, in the combination of a coupling-ring with elongated gudgeons with a coupling-sleeve having circular bearings on the inner face thereof, connected by grooves with the end of said sleeve; the said combination admitting of the casting of said coupling-sleeve, coupling-ring, and spherical socket so that they may be united by being simply inserted and turned, one within the other, without the addition of any other parts, as is hereinafter more fully shown, thereby lessening the cost of manufacturing the coupling.

Figure 2:
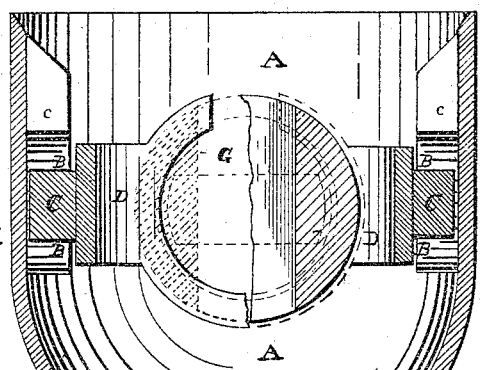
Figure 4:
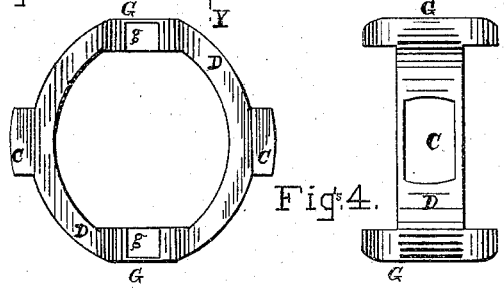
Figure 3:
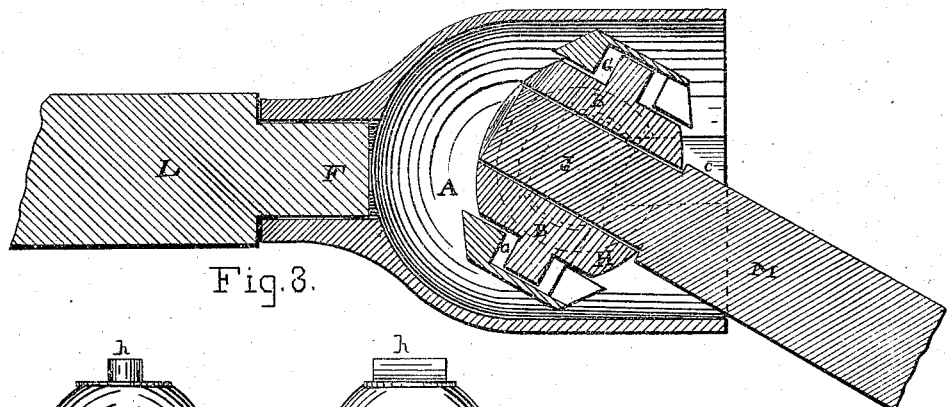
Figure 5:
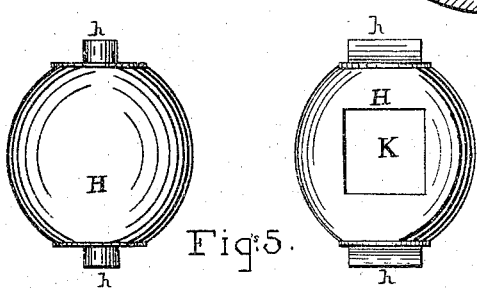

In the accompanying drawing, Figure 1 is an end view of my coupling. Fig. 2 is a section of same through line $x\ x$ in Fig. 1. Fig. 3 is also a section through the line $y\ y$ in Fig. 1, showing two shafts working at an angle with each other. Figs. 4 are side and end views of coupling-ring. Figs. 5 are side and end views of the spherical socket.

H is a spherical socket, in which is the hole K of an angular cross-section for the shaft M, and at the ends of which are the gudgeons $h$, of an elongated shape, and slightly curved at each end of the elongations. D is the coupling-ring, having, at the extremities of one diameter, two circular sockets, G, with grooves $g$ leading into said sockets in which the gudgeons $h$ of the spherical socket H bear and turn, said ring D being of such size as to permit the spherical socket H to turn freely therein on its axial gudgeons $h$. At the extremities of the other diameter of the ring D are two gudgeons, C, also of elongated shape and with curved end faces, said faces being curved to allow perfectly free motion in the sockets B cast in the sleeve A, the entrance to which sockets is by the grooves $c$. A is a sleeve of circular cross-section, having the shaft-socket E and the circular sockets B for the gudgeons C of the ring D, said sleeve A being so constructed as to admit of an entire revolution of the ring D without friction on any of its parts except the gudgeon C. L and M are two shafts which the coupling is to connect, the one having its head F inserted in the socket E of the sleeve A, and the other having its head J inserted in the hole K in the spherical socket H; the said shafts being shown as working at an angle with each other.

When the shafts are inserted in their sockets, the shaft L in the socket E of the sleeve A, and the shaft M in the hole K in the spherical socket H, the shaft M can take any angular position with respect to the shaft L that is permitted by the periphery of the sleeve A, and evidently has a much greater range of said angular motion than if it were inclosed in a sleeve projecting from the socket H, as in previous constructions.

The ring D, sleeve A, and spherical socket H are cast, each, as a single piece, thus lessening the cost of construction; and, from their peculiar details of construction, can be secured together without the addition of any other parts, the ring G in the sleeve A holding it so that its elongated gudgeons are in line with the grooves c of the sleeve; then sliding them into the bearings, and turning the ring around so as to bring it into position to receive the spherical socket, which is inserted in the ring in the same manner as the ring in the sleeve. The ring and spherical socket have also this peculiar and important feature that, when they have been used for some time on one side, and their gudgeons have become worn thereby, each can be turned over, the ring in the sleeve, and the spherical socket in the ring, so as to bring the unused faces of their respective gudgeons into action, when the coupling can be used again as if the parts were new. The spherical form of the spherical socket is of special importance, as it affords, in itself and without the need of any sleeve cast at its side, a strong bearing for the head of the shaft; and offers, by said peculiar spherical form, no obstruction to its turning in the coupling-ring and sleeve to any extent permitted by the bearing of the ring and the periphery of the sleeve.

Having thus fully described my invention, what I claim as new, and desire to secure by Letters Patent, is—

1. In a shaft-coupling, the combination of a coupling-sleeve, coupling-ring, and spherical socket, constructed and arranged so that the coupling-ring may be revolved on its bearings in the coupling-sleeve; and also so that the spherical socket may be revolved on its bearings in the coupling-ring, substantially as and for the purpose specified.

2. The combination, with the coupling-ring, of a shaft-coupling, of a spherical socket, made of a sufficient size to admit and hold one of the shafts to be coupled without the aid of a side sleeve, and so arranged that it may be revolved on its bearings in the coupling-ring, substantially and for the purpose specified.

3. A spherical socket for shaft-couplings with gudgeons cast thereon of an elongated form, substantially as and for the purpose specified.

4. The combination of a spherical socket with elongated gudgeons with a coupling-ring having circular inner bearings connected by grooves with its outer edges, substantially as and for the purpose specified.

5. A coupling-ring for shaft-couplings with gudgeons cast thereon of an elongated form, substantially as and for the purpose specified.

6. A coupling-sleeve for shaft-couplings, with circular inner bearings cast thereon, with grooves connecting said bearings with the end of said coupling, substantially as and for the purpose specified.

7. The combination of a coupling-ring with elongated gudgeons with a coupling-sleeve having circular inner bearings, connected by grooves with its end edge, substantially as and for the purpose herein specified.

HERBERT S. LELAND.

Witnesses:
JOB ABBOTT,
JAMES F. TWEEDY.